(12) United States Patent
Zhou et al.

(10) Patent No.: US 12,264,681 B2
(45) Date of Patent: Apr. 1, 2025

(54) DUAL PRESSURE-BOOSTING HIGH WIND SPEED FAN

(71) Applicant: Dongguan Lianfeng Motor Co., Ltd., Dongguan (CN)

(72) Inventors: Qiwei Zhou, Nanchong (CN); Rong Luo, Dongguan (CN); Xianqiang Li, Dongguan (CN)

(73) Assignee: Dongguan Lianfeng Motor Co., Ltd., Dongguan (CN)

( * ) Notice: Subject to any disclaimer, the term of this patent is extended or adjusted under 35 U.S.C. 154(b) by 61 days.

(21) Appl. No.: 18/348,665

(22) Filed: Jul. 7, 2023

(65) Prior Publication Data
US 2024/0295222 A1    Sep. 5, 2024

(30) Foreign Application Priority Data
Mar. 3, 2023    (CN) .......................... 202310194446.1

(51) Int. Cl.
| | |
|---|---|
| F04D 25/06 | (2006.01) |
| F04D 19/00 | (2006.01) |
| F04D 29/28 | (2006.01) |
| F04D 29/32 | (2006.01) |
| F04D 29/52 | (2006.01) |

(52) U.S. Cl.
CPC .......... F04D 25/06 (2013.01); F04D 19/002 (2013.01); F04D 29/281 (2013.01); F04D 29/325 (2013.01); F04D 29/522 (2013.01)

(58) Field of Classification Search
None
See application file for complete search history.

(56) References Cited

U.S. PATENT DOCUMENTS 11,018,538 B2 *  5/2021  Sawada ............... F04D 25/0606

FOREIGN PATENT DOCUMENTS

| CN | 105370608 A | 3/2016 | |
|---|---|---|---|
| CN | 210068534 U | 2/2020 | |
| CN | 213016904 U | 4/2021 | |
| CN | 214036195 U | * 8/2021 | ............. F04D 25/08 |

* cited by examiner

*Primary Examiner* — Sabbir Hasan
(74) *Attorney, Agent, or Firm* — Nitin Kaushik (57) ABSTRACT

Disclosed is a dual pressure-boosting high wind speed fan, including a driving motor, a fan housing and a fan blade. An air duct of the housing is formed inside the fan housing; the fan blade is provided with a shaft mounting portion and a blade assembly, wherein the shaft mounting portion is tightly mounted on a power output shaft of the driving motor through a shaft mounting hole; and the fan housing includes a cylindrical wall of the housing, a spherical portion and a motor fixing portion. The dual pressure-boosting high wind speed fan features novel structural design, high working wind speed, small turbulent flow and noise and good mute effect.

7 Claims, 8 Drawing Sheets

DUAL PRESSURE-BOOSTING HIGH WIND SPEED FAN

CROSS-REFERENCE TO RELATED APPLICATIONS

The application claims priority to Chinese patent application No. 2023101944461, filed on Mar. 3, 2023, the entire contents of which are incorporated herein by reference.

TECHNICAL FIELD

The present invention relates to the technical field of high speed fans, and particularly relates to a dual pressure-boosting high wind speed fan.

BACKGROUND

As a daily necessity for hair care or cloths drying, a hair drier is widely applied in daily life of people. When the hair drier works, a fan inside the hair drier is started and promotes an air flow to flow from back to front. A heater inside the hair drier heats the air flow to generate hot wind.

A Chinese patent for invention titled with "Small high speed fan" with the patent number ZL 202023037935.7 includes a housing, a fan blade, a motor and a bearing. The housing is respectively provided with a front end and a rear end from front to back along the direction of the central axis. The motor is fixed to the rear end of the housing and is connected to the fan blade through an output shaft of the motor, the fan blade and the housing are coaxially arranged, the fan blade is arranged at the front end of the housing, and the output shaft of the motor is connected to the housing through the bearing. It can be known with reference to the drawings of the description of the patent for invention that the fan blade of the fan only has one blade assembly, and the blade assembly includes a plurality of blades distributed in an annular array.

It should be pointed out that concerning the above small high speed fan, it has the following specific defects in an actual using process:

1. As the fan blade only has one blade assembly, concerning the high speed fan, it is difficult to further improve the wind pressure and the wind speed;
2. A turbulent flow is easily generated in a middle position of an air duct, and the turbulent action will increase vibration of the blades and generate vibration noise, that is, the high speed fan has the defects of large noise and poor mute effect; and
3. An air inlet of the air duct of the housing is only an annular portion corresponding to a blade area, the air inlet area is large in loss, and there is a defect of small air inlet quantity.

SUMMARY

Aiming at shortcomings in the prior art, the objective of the present invention is to provide a dual pressure-boosting high wind speed fan which features novel structural design, high working wind speed, small turbulent flow and noise and good mute effect.

To achieve the above objective, the present invention is realized by the following technical solution:

a dual pressure-boosting high wind speed fan, including a driving motor, a fan housing and a fan blade, wherein an air duct of the housing is formed inside the fan housing, the fan blade is located in a front end air inlet of the air duct of the housing, and the driving motor is assembled in the fan housing;

the fan blade is provided with a shaft mounting portion and a blade assembly, a middle position of the shaft mounting portion is provided with a shaft mounting hole, and the shaft mounting portion is tightly mounted on a power output shaft of the driving motor through the shaft mounting hole; and wherein the fan housing includes a cylindrical wall of the housing in a cylindrical shape, the fan housing is provided with a spherical portion arranged coaxially with the cylindrical wall of the housing inside the cylindrical wall of the housing, a rear end edge portion of the spherical portion is provided with a motor fixing portion arranged spaced from the cylindrical wall of the housing, the driving motor is tightly mounted on the motor fixing portion, the power output shaft of the driving motor is mounted on the spherical portion through a bearing, and the fan blade is located at a front end side of the spherical portion;

an outer side wall of the spherical portion is a spherical surface, and a portion of the air duct of the housing located between the spherical portion and the cylindrical wall of the housing is in a necking shape decreasing gradually from front to back;

the fan blade further includes a middle circular ring portion which is in a circular ring shape and is located at the periphery of the shaft mounting portion, and the middle circular ring portion and the shaft mounting portion are coaxially arranged at an interval; the blade assembly includes a first blade assembly and a second blade assembly, wherein the first blade assembly includes a plurality of first driving blades distributed between the shaft mounting portion and an inner side wall of the middle circular ring portion in an annular array, and the second blade assembly includes a plurality of second driving blades distributed on an outer side wall of the middle circular ring portion in an annular array; and the shaft mounting portion, the middle circular ring portion, the first blade assembly and the second blade assembly are of an integrated structure;

the shaft mounting portion is in a frustum shape with a small front end diameter and a large rear end diameter, and a side wall of the shaft mounting portion is a cone-shaped wind guide surface in a conical surface shape; the inner side wall of the middle circular ring portion is in a flaring shape with an inner diameter value increasing gradually from front to back, a channel between the cone-shaped wind guide surface of the shaft mounting portion and the inner side wall of the middle circular ring portion is an inner air duct of the fan blade, and the inner air duct of the fan blade is in a flaring shape increasing gradually from back to front; and a channel between the outer side wall of the middle circular ring portion and the cylindrical wall of the housing is an outer air duct of the fan blade, and the outer air duct of the fan blade is in a flaring shape increasing gradually from back to front.

A thickness value of a middle portion of the middle circular ring portion is greater than that of both ends, and a front end of the outer side wall and a front end of the inner side wall are transitioned directly through an arc-shaped curved surface.

A front end of the shaft mounting portion extends to a front end side of the middle circular ring portion, and a front end of the cone-shaped wind guide surface and a front end surface of the shaft mounting portion are transitioned through a filleted corner.

The motor fixing portion includes a plurality of motor fixing plates which are distributed in an annular array and are arc-shaped, respectively, a front end portion of each of the motor fixing plates is connected to the spherical portion, and a housing of the driving motor is enclasped and fixed through the motor fixing plates; and a positioned radiating gap communicated with the air duct of the housing is formed between two adjacent motor fixing plates, the housing of the driving motor corresponding to each of the positioned radiating gaps is provided with a bulge of the housing, and each of the bulges of the housing is mounted in the corresponding positioned radiating gap in a positioned manner.

A ribbed slab of the housing is arranged between each of the motor fixing plates and the cylindrical wall of the housing, the ribbed slabs of the housing are distributed in an annular array, and the spherical portion, the motor fixing plates, the ribbed slabs of the housing and the cylindrical wall of the housing are of an integrated structure.

The fan blade is an integrated metal part or an integrated plastic part.

Each of the first driving blades is a centrifuge blade, and each of the second driving blades is an axial flow blade.

Compared with the prior art, the present invention has the following beneficial effects:
1. The fan blade in the embodiment is capable of driving the air flow in the middle position of the air duct through each of the first driving blades in the first blade assembly to further reduce air flow disturbance in the middle position of the air duct, so as to achieve the purpose of reducing the turbulent flow; and is capable of effectively reducing the turbulent noise generated by the turbulent flow, so as to improve the mute effect of the fan;
2. The fan blade provided by the present invention jointly drives the air flow to flow through the first blade assembly and the second blade assembly, and the double blade structures are capable of effectively increasing the wind pressure to increase the wind speed;
3. In the process that the driving motor drives the fan blade to rotate through its power output shaft, each of the first driving blades in the first blade assembly promotes the air flow to enter between the spherical portion and the cylindrical wall of the housing through the inner air duct of the fan blade of the fan blade, and each of the second driving blades in the second blade assembly promotes the air flow to enter between the spherical portion and the cylindrical wall of the housing through the outer air duct of the fan blade of the fan blade. Since the inner air duct of the fan blade and the outer air duct of the fan blade are respectively in flaring shapes increasing gradually from back to front, the inner air duct of the fan blade and the outer air duct of the fan blade in the flaring shapes are capable of effectively increasing the area of the air inlet, so as to increase the air inlet quantity and the wind speed;
4. Since the shaft mounting portion is in the frustum shape with the small front end diameter and the large rear end diameter, the inner air duct of the fan blade located between the cone-shaped wind guide surface and the inner side wall of the middle circular ring portion is capable of guiding the air flow driven by the first blade assembly to be obliquely blown to the spherical surface of the spherical portion, and thus, the resistance of the inner air duct of the fan blade can be effectively reduced, so that the wind speed and the air inlet quantity can be improved;
5. Concerning the spherical portion of the present invention, it is capable of effectively increasing the air inlet area of the front end air inlet of the fan housing, thereby improving the air inlet quantity by decreasing the air inlet area; and
6. The pressure-boosting high wind speed fan disclosed by the present invention features novel structural design, high working wind speed, small turbulent flow and noise and good mute effect.

BRIEF DESCRIPTION OF DRAWINGS

The present invention will be further described below by means of the drawings, but the embodiments in the drawings do not limit the present invention by any means.

FIG. 9 is a schematic diagram of the fan blade of the present invention compared with a simulated cloud diagram of an existing air duct of the fan blade.

In FIGS. 1-8,

1—driving motor; 11—bulge of housing; 2—fan housing; 21—air duct of housing; 22—cylindrical wall of housing; 23—spherical portion; 24—motor fixing portion; 241—motor fixing plate; 242—positioned radiating gap; 25—ribbed slab of housing; 3—fan blade; 31—shaft mounting portion; 311—shaft mounting hole; 312—cone-shaped wind guide surface; 313—filleted corner; 32—middle circular ring portion; 321—arc-shaped curved surface; 33—first driving blade; 34—second driving blade; 35—inner air duct of fan blade; 36—outer air duct of fan blade.

DETAILED DESCRIPTION OF THE EMBODIMENTS

The present invention is described below in combination with specific implementation modes.

In an embodiment I, as shown in FIGS. 1-4, a dual pressure-boosting high wind speed fan includes a driving motor 1, a fan housing 2 and a fan blade 3, wherein an air duct 21 of the housing is formed inside the fan housing 2, the fan blade 3 is located in a front end air inlet of the air duct 21 of the housing, and the driving motor 2 is assembled in the fan housing 1.

As shown in FIGS. 1, 2, 3, 4, 6 and 7, the fan blade 3 is provided with a shaft mounting portion 31 and a blade assembly, a middle position of the shaft mounting portion 31 is provided with a shaft mounting hole 311, and the shaft mounting portion 31 is tightly mounted on a power output shaft of the driving motor 1 through the shaft mounting hole 311.

Further, as shown in FIGS. 1, 2, 3, 4, 5 and 8, the fan housing 2 includes a cylindrical wall 22 of the housing in a cylindrical shape, the fan housing 2 is provided with a spherical portion 23 arranged coaxially with the cylindrical wall 22 of the housing inside the cylindrical wall 22 of the housing, a rear end edge portion of the spherical portion 23 is provided with a motor fixing portion 24 arranged spaced from the cylindrical wall 22 of the housing, the driving motor 1 is tightly mounted on the motor fixing portion 24, the power output shaft of the driving motor 1 is mounted on the spherical portion 23 through a bearing, and the fan blade 3 is located at a front end side of the spherical portion 23.

Figure 1:
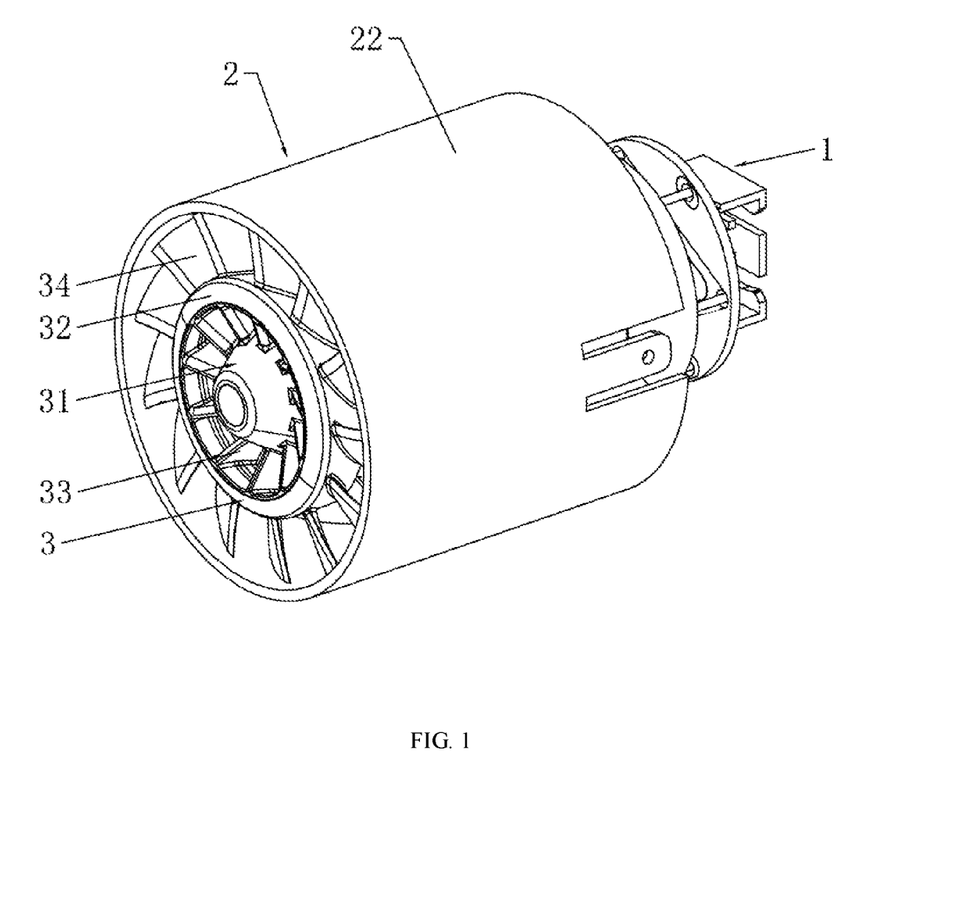
FIG. 1 is a structural schematic diagram of the present invention.
Figure 2:
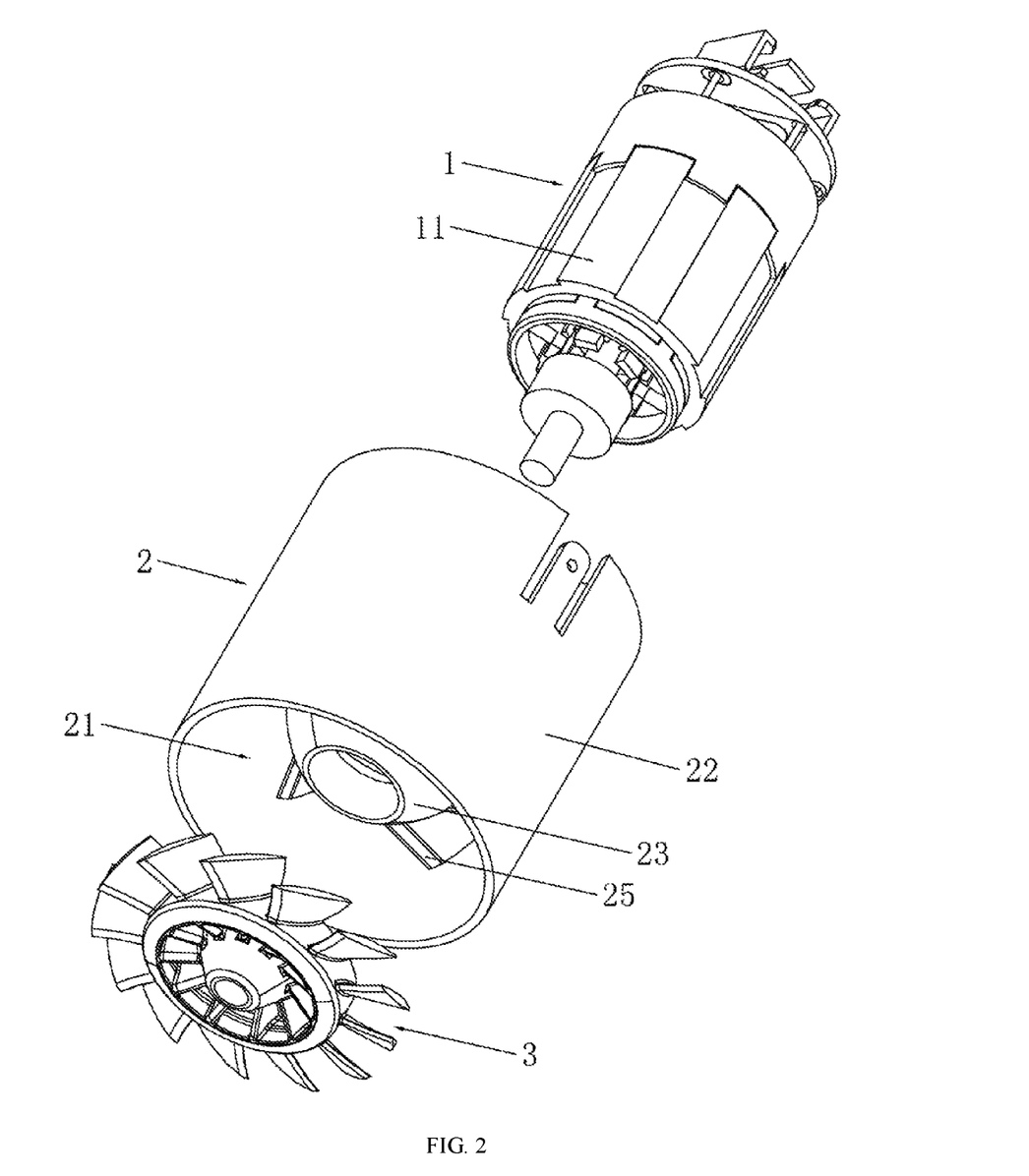
FIG. 2 is an exploded schematic diagram of the present invention.
Figure 3:
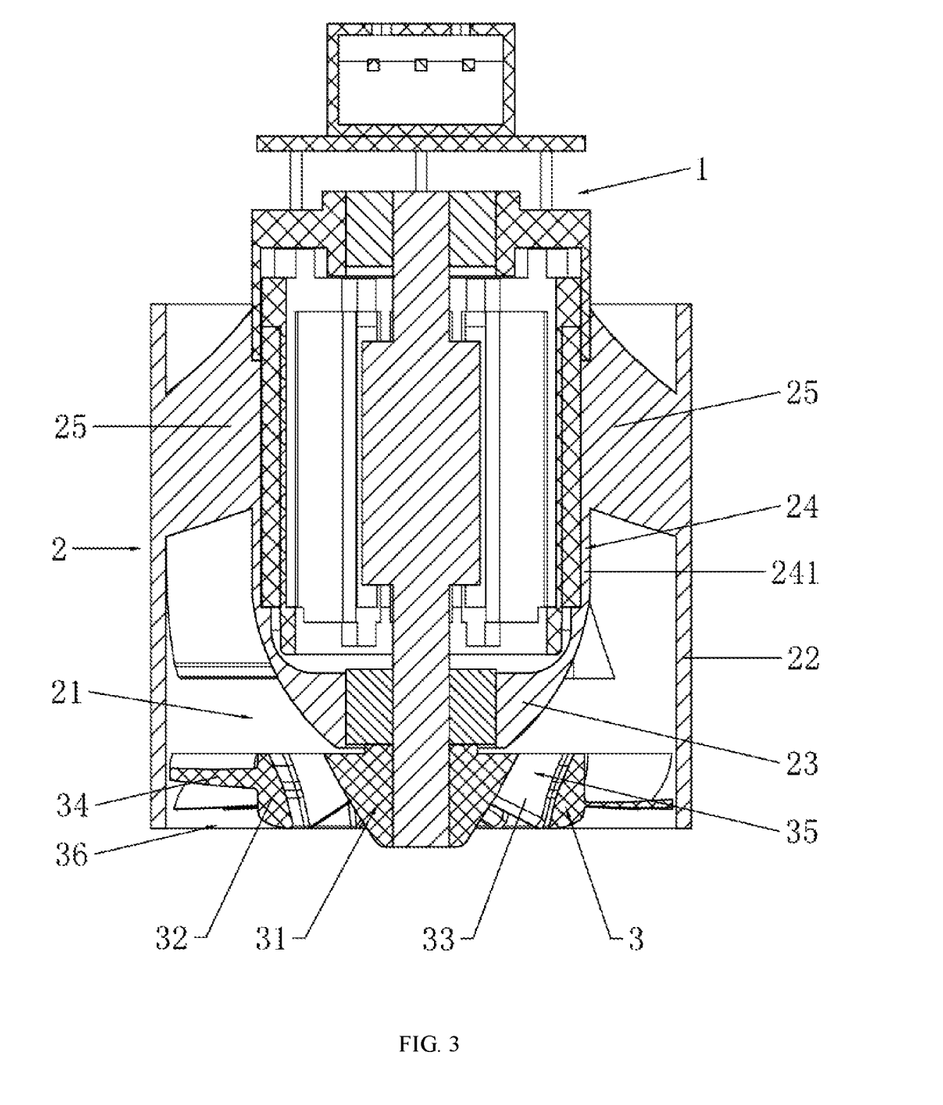
FIG. 3 is a schematic sectional view of the present invention.
Figure 4:
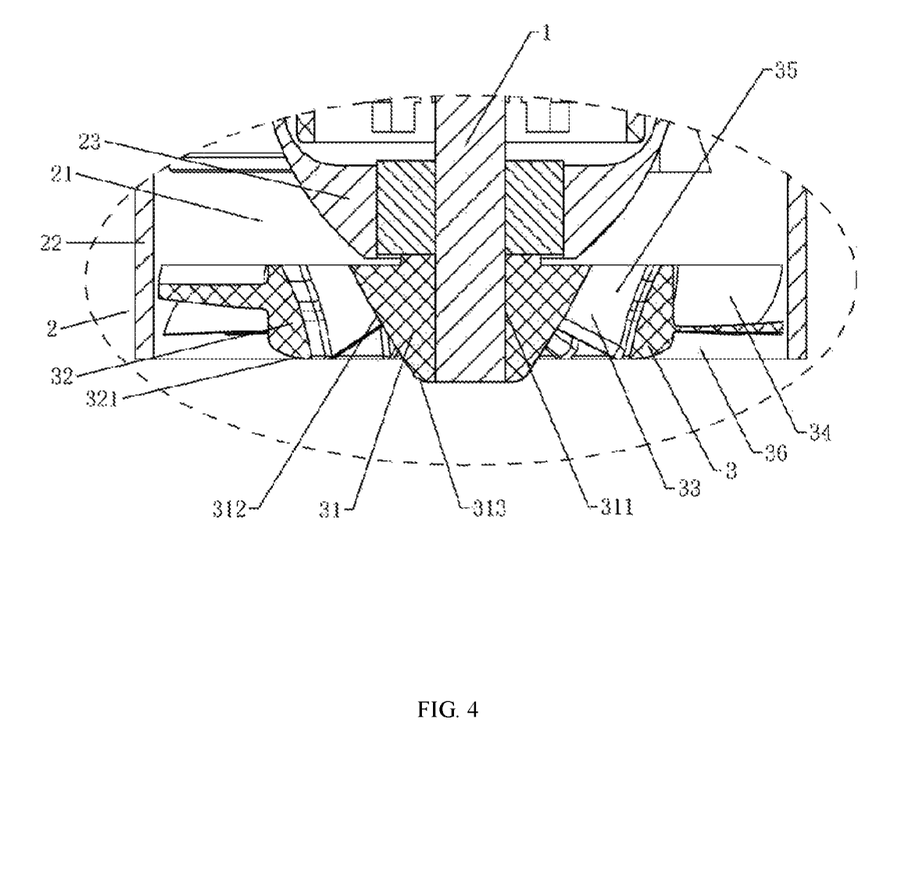
FIG. 4 is a partial enlarged drawing of FIG. 3.

Further, as shown in FIGS. 2-4, an outer side wall of the spherical portion 23 is a spherical surface, and a portion of the air duct 21 of the housing located between the spherical portion 23 and the cylindrical wall 22 of the housing is in a necking shape decreasing gradually from front to back.

In addition, as shown in FIGS. 3, 4, 6 and 7, the fan blade 3 further includes a middle circular ring portion 32 which is in a circular ring shape and is located at the periphery of the shaft mounting portion 31, and the middle circular ring portion 32 and the shaft mounting portion 31 are coaxially arranged at an interval; the blade assembly includes a first blade assembly and a second blade assembly, wherein the first blade assembly includes a plurality of first driving blades 33 distributed between the shaft mounting portion 31 and an inner side wall of the middle circular ring portion 32 in an annular array, and the second blade assembly includes a plurality of second driving blades 34 distributed on an outer side wall of the middle circular ring portion 32 in an annular array; and the shaft mounting portion 31, the middle circular ring portion 32, the first blade assembly and the second blade assembly are of an integrated structure. The fan blade 3 is an integrated metal part or an integrated plastic part.

Furthermore, as shown in FIGS. 3 and 4, the shaft mounting portion 31 is in a frustum shape with a small front end diameter and a large rear end diameter, and a side wall of the shaft mounting portion 31 is a cone-shaped wind guide surface 312 in a conical surface shape; the inner side wall of the middle circular ring portion 32 is in a flaring shape with an inner diameter value increasing gradually from front to back, a channel between the cone-shaped wind guide surface 312 of the shaft mounting portion 31 and the inner side wall of the middle circular ring portion 32 is an inner air duct 35 of the fan blade, and the inner air duct 35 of the fan blade is in a flaring shape increasing gradually from back to front.

It is needed to further point out that as shown in FIGS. 3 and 4, a channel between the outer side wall of the middle circular ring portion 32 and the cylindrical wall 22 of the housing is an outer air duct 36 of the fan blade, and the outer air duct 36 of the fan blade is in a flaring shape increasing gradually from back to front.

In the working process of the embodiment I, the driving motor 1 drives the fan blade 3 to rotate through its power output shaft, and the fan blade 3 drives air to flow through each of the first driving blades 33 in the first blade assembly and each of the second driving blades 34 in the second blade assembly to form an air flow; so that the air flow passes through the air duct 21 of the housing of the fan housing 2 from front to back.

It is needed to emphasize that the fan blade 3 in the embodiment is capable of driving the air flow in the middle position of the air duct through each of the first driving blades 33 in the first blade assembly to further reduce air flow disturbance in the middle position of the air duct, so as to achieve the purpose of reducing the turbulent flow, and is capable of effectively reducing the turbulent noise generated by the turbulent flow, so as to improve the mute effect of the fan; furthermore, the fan blade 3 in the embodiment I jointly drives the air flow to flow through the first blade assembly and the second blade assembly, and the double blade structures are capable of effectively increasing the wind pressure to increase the wind speed.

It is needed to further emphasize that in the process that the driving motor 1 drives the fan blade 3 to rotate through its power output shaft, each of the first driving blades 33 in the first blade assembly promotes the air flow to enter between the spherical portion 23 and the cylindrical wall 22 of the housing through the inner air duct 35 of the fan blade of the fan blade 3, and each of the second driving blades 34 in the second blade assembly promotes the air flow to enter between the spherical portion 23 and the cylindrical wall 22 of the housing through the outer air duct 36 of the fan blade of the fan blade 3. Since the inner air duct 35 of the fan blade and the outer air duct 36 of the fan blade are respectively in flaring shapes increasing gradually from back to front, the inner air duct 35 of the fan blade and the outer air duct 36 of the fan blade in the flaring shapes are capable of effectively increasing the area of the air inlet, so as to increase the air inlet quantity and the wind speed.

Furthermore, since the shaft mounting portion 31 is in the frustum shape with the small front end diameter and the large rear end diameter, the inner air duct 35 of the fan blade located between the cone-shaped wind guide surface 312 and the inner side wall of the middle circular ring portion 32 is capable of guiding the air flow driven by the first blade assembly to be obliquely blown to the spherical surface of the spherical portion 23, and thus, the resistance of the inner air duct 35 of the fan blade can be effectively reduced, so that the wind speed and the air inlet quantity can be improved.

It is needed to further explain that concerning the spherical portion 23 in the embodiment I, it is capable of effectively increasing the air inlet area of the front end air inlet of the fan housing 2, thereby improving the air inlet quantity by decreasing the air inlet area.

Concerning the dual pressure-boosting high wind speed fan in the embodiment I, its test data is shown in the following table:

| Power of driving motor | Rotating speed of driving motor | Wind speed at a distance of 10 cm | Wind pressure at a distance of 10 cm | Noise at a distance of 30 cm |
|---|---|---|---|---|
| 100 w | 100500 rpm | 23 m/s | 150 g | 83 dB |

Therefore, it can be known by integrating the above conditions that concerning the pressure-boosting high wind speed fan in the embodiment I, it features novel structural design, high working wind speed, small turbulent flow and noise and good mute effect.

In an embodiment II, as shown in FIGS. 3 and 4, the difference between the embodiment II and the embodiment I lies that a thickness value of a middle portion of the middle circular ring portion 32 is greater than that of both ends, and a front end of the outer side wall and a front end of the inner side wall are transitioned directly through an arc-shaped curved surface 321.

Concerning the middle circular ring portion 32 in the embodiment II, since the thickness value of the middle portion is greater than that of both ends, i.e., the thickened middle position is capable of effectively guaranteeing the integral strength of the middle circular ring portion 32, so that the connecting strength of each of the second driving blades 34 can be effectively guaranteed. In addition, since the thickness values at both ends of the middle circular ring portion 32 are smaller, the middle circular ring portion 32 of the structural design is capable of effectively reducing hindrance to the air flow at both ends and increasing the area of air channels at both ends, thereby improving the air inlet quantity.

In an embodiment III, as shown in FIG. 4, the difference between the embodiment III and the embodiment I lies that a front end of the shaft mounting portion 31 extends to a front end side of the middle circular ring portion 32, and a front end of the cone-shaped wind guide surface 312 and a front end surface of the shaft mounting portion 31 are transitioned through a filleted corner 313.

The shaft mounting portion 31 of the structural design is capable effectively improving the flow guiding effect of the cone-shaped wind guide surface 312, so as to improve the air inlet quantity into the inner air duct 35 of the fan blade. Transitioned through the filleted corner 313, the embodiment III is capable of effectively reducing hindrance to the air flow by the front end surface of the shaft mounting portion 31.

Figure 5:
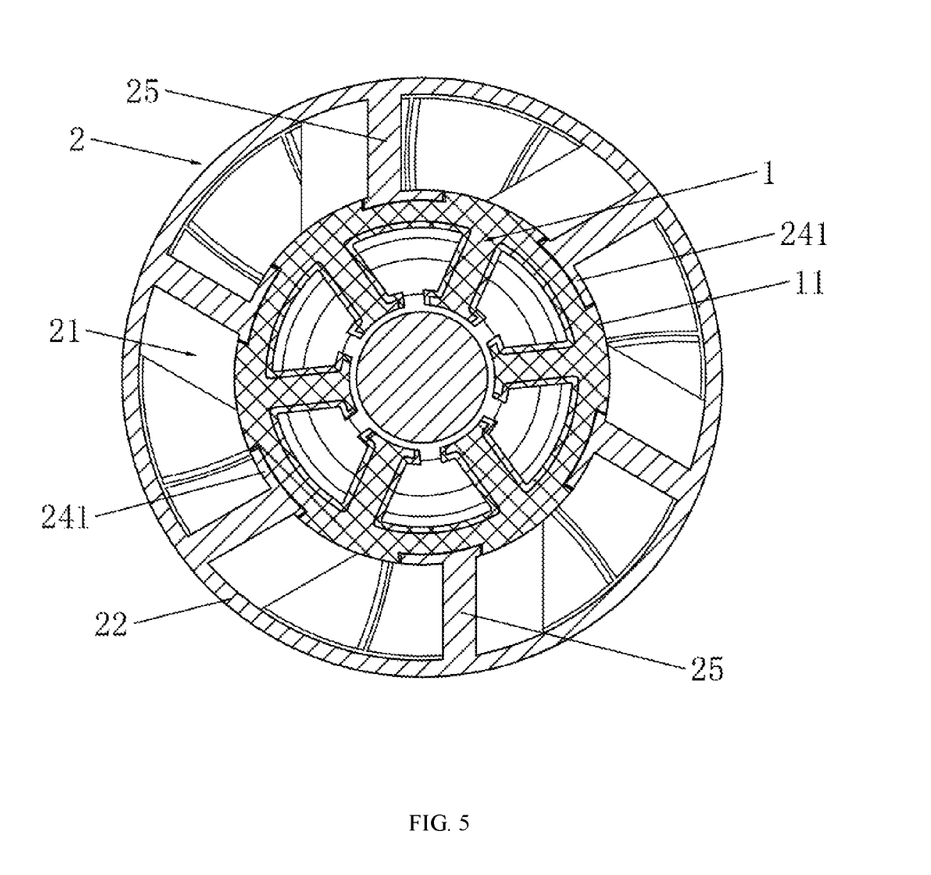
FIG. 5 is a schematic sectional view of another position of the present invention.
Figure 6:
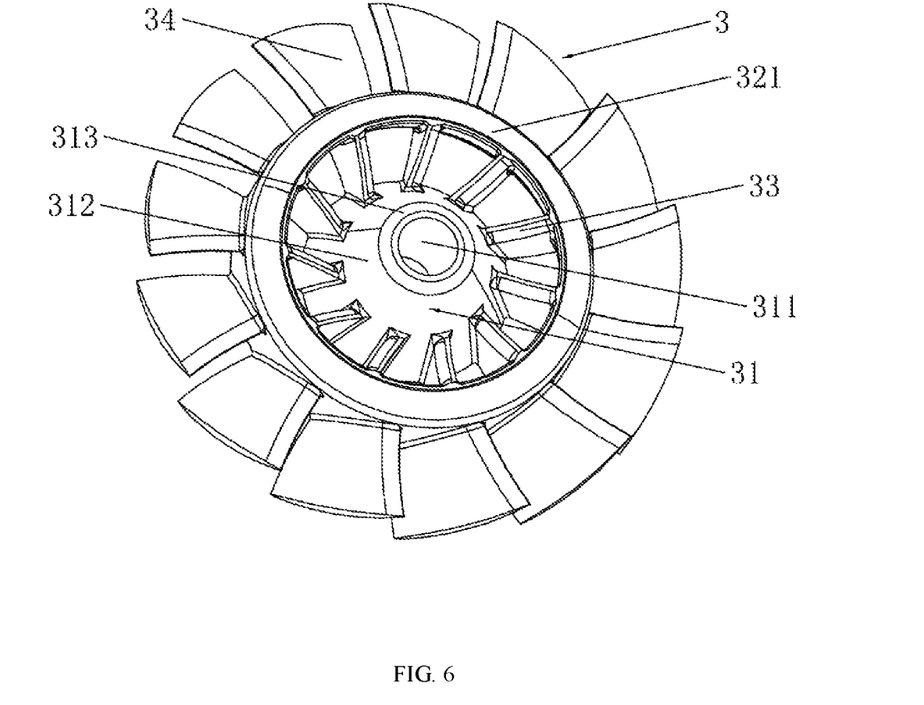
FIG. 6 is a structural schematic diagram of a fan blade of the present invention.
Figure 7:
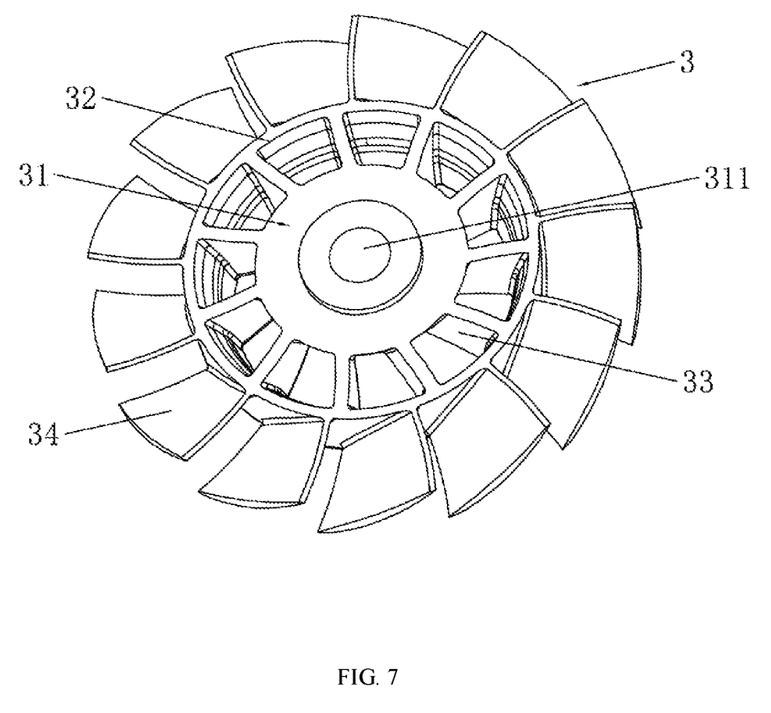
FIG. 7 is a structural schematic diagram of the fan blade of the present invention from another angle of view.
Figure 8:
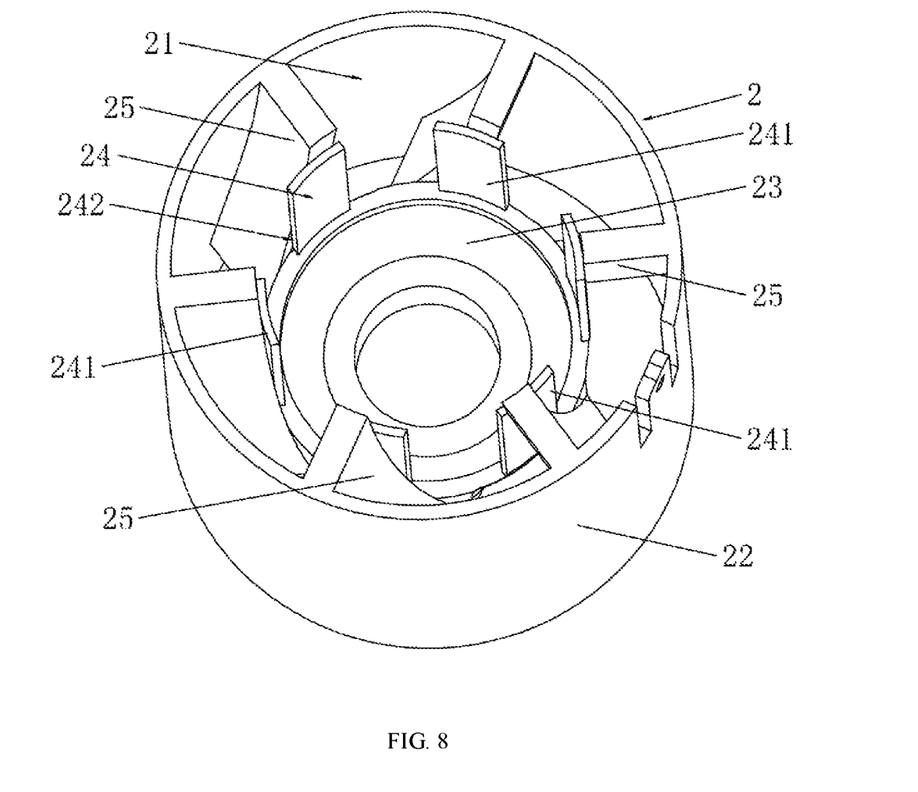
FIG. 8 is a structural schematic diagram of a housing of a fan of the present invention.

In an embodiment IV, as shown in FIGS. 5 and 8, the motor fixing portion 24 includes a plurality of motor fixing plates 241 which are distributed in an annular array and are arc-shaped, respectively, a front end portion of each of the motor fixing plates 241 is connected to the spherical portion, and a housing of the driving motor 1 is enclasped and fixed through the motor fixing plates 241.

A positioned radiating gap 242 communicated with the air duct 21 of the housing is formed between two adjacent motor fixing plates 241, the housing of the driving motor 1 corresponding to each of the positioned radiating gaps 242 is provided with a bulge 11 of the housing, and each of the bulges 11 of the housing is mounted in the corresponding positioned radiating gap 242 in a positioned manner.

Furthermore, a ribbed slab 25 of the housing is arranged between each of the motor fixing plates 241 and the cylindrical wall 22 of the housing, the ribbed slabs 25 of the housing are distributed in an annular array, and the spherical portion 23, the motor fixing plates 241, the ribbed slabs 25 of the housing and the cylindrical wall 22 of the housing are of an integrated structure.

In the process of mounting the driving motor 1 in the motor fixing portion 24, by matching the budges 11 of the housing with the positioned radiating gaps 242, in the embodiment IV, the driving motor 1 can be rapidly mounted and positioned, so that the assembling efficiency and accuracy of the driving motor 1 are improved.

Furthermore, concerning the positioned radiating gaps 242 in an embodiment IV, when the driving motor 1 is mounted in the motor fixing portion 24, the motor fixing portion 24 enclasps and fixes the housing of the driving motor 1 through the plurality of motor fixing plates 241. The bulges 11 of the housing of the driving motor 1 are exposed out of the air duct 21 of the housing. In the process that the driving motor 1 drives the fan blade and enables the air flow to flow through the air duct 21 of the housing, the air flow directly contacts the housing of the driving motor 1 and is capable of reducing radiation of the driving motor 1, thereby prolonging the service life of the driving motor 1.

In the embodiment V, the difference between the embodiment V and the embodiment I lies that each of the first driving blades 33 is a centrifuge blade, and each of the second driving blades 34 is an axial flow blade.

The above mentioned is only the preferred embodiments of the present invention. For those of ordinary skill in the art, variations will be made in specific embodiments and application range in terms of concept of the present invention. The content in the description shall not be construed as limitations to the present invention.

What is claimed is:

1. A dual pressure-boosting high wind speed fan, comprising a driving motor, a fan housing and a fan blade, wherein an air duct is formed inside the fan housing, the fan blade is located in a front end air inlet of the air duct, and the driving motor is assembled in the fan housing;

the fan blade is provided with a shaft mounting portion and a blade assembly, a middle position of the shaft mounting portion is provided with a shaft mounting hole, and the shaft mounting portion is tightly mounted on a power output shaft of the driving motor through the shaft mounting hole; and wherein the fan housing comprises a cylindrical wall in a cylindrical shape, the fan housing is provided with a spherical portion arranged coaxially with the cylindrical wall inside the cylindrical wall, a rear end edge portion of the spherical portion is provided with a motor fixing portion arranged spaced from the cylindrical wall, the driving motor is mounted on the motor fixing portion, the power output shaft of the driving motor is mounted on the spherical portion through a bearing, and the fan blade is located at a front end side of the spherical portion;

an outer side wall of the spherical portion is a spherical surface, and a portion of the air duct located between the spherical portion and the cylindrical wall is in a necking shape decreasing gradually from front to back;

the fan blade further comprises a middle circular ring portion which is in a circular ring shape and is located at the periphery of the shaft mounting portion, and the middle circular ring portion and the shaft mounting portion are coaxially arranged at an interval; the blade assembly comprises a first blade assembly and a second blade assembly, wherein the first blade assembly comprises a plurality of first driving blades distributed between the shaft mounting portion and an inner side wall of the middle circular ring portion in an annular array, and the second blade assembly comprises a plurality of second driving blades distributed on an outer side wall of the middle circular ring portion in an annular array; and the shaft mounting portion, the middle circular ring portion, the first blade assembly and the second blade assembly are of an integrated structure;

the shaft mounting portion is in a frustum shape with a front end diameter and a rear end diameter larger than the front end diameter, and a side wall of the shaft mounting portion is a cone-shaped wind guide surface in a conical surface shape; the inner side wall of the middle circular ring portion is in a flaring shape with an inner diameter value increasing gradually from front to back, a channel between the cone-shaped wind guide surface of the shaft mounting portion and the inner side wall of the middle circular ring portion is an inner air duct of the fan blade, and the inner air duct of the fan blade is in a flaring shape increasing gradually from back to front; and a channel between the outer side wall of the middle circular ring portion and the cylindrical wall is an outer air duct of the fan blade, and the outer air duct of the fan blade is in a flaring shape increasing gradually from back to front.

2. The dual pressure-boosting high wind speed fan according to claim 1, wherein a thickness value of a middle portion of the middle circular ring portion is greater than that of both ends, and a front end of the outer side wall and a front end of the inner side wall are transitioned directly through an arc-shaped curved surface.

3. The dual pressure-boosting high wind speed fan according to claim 1, wherein a front end of the shaft mounting portion extends to a front end side of the middle circular ring portion, and a front end of the cone-shaped wind guide surface and a front end surface of the shaft mounting portion are transitioned through a filleted corner.

4. The dual pressure-boosting high wind speed fan according to claim 1, wherein the motor fixing portion comprises a plurality of motor fixing plates which are distributed in an annular array and are arc-shaped, respectively, a front end portion of each of the motor fixing plates is connected to the spherical portion, and a housing of the driving motor is enclasped and fixed through the motor fixing plates; and a positioned radiating gap communicated with the air duct is formed between two adjacent motor fixing plates, a housing of the driving motor is provided with bulges corresponding to the positioned radiating gaps, and each of the bulges is mounted in the corresponding positioned radiating gap in a positioned manner.

5. The dual pressure-boosting high wind speed fan according to claim 4, wherein a ribbed slab is arranged between each of the motor fixing plates and the cylindrical wall, the ribbed slabs are distributed in an annular array, and the spherical portion, the motor fixing plates, the ribbed slabs and the cylindrical wall are of an integrated structure.

6. The dual pressure-boosting high wind speed fan according to claim 1, wherein the fan blade is an integrated metal part or an integrated plastic part.

7. The dual pressure-boosting high wind speed fan according to claim 1, wherein each of the first driving blades is a centrifuge blade, and each of the second driving blades is an axial flow blade.

* * * * *